(12) United States Patent
Suzuki (10) Patent No.: US 6,750,620 B2
(45) Date of Patent: Jun. 15, 2004

(54) DISCHARGE LAMP IGNITER DEVICE AND PROJECTOR DEVICE

(75) Inventor: Toshio Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/333,834

(22) PCT Filed: Jun. 10, 2002

(86) PCT No.: PCT/JP02/05746

§ 371 (c)(1),
(2), (4) Date: Apr. 28, 2003

(87) PCT Pub. No.: WO02/102120

PCT Pub. Date: Dec. 19, 2002

(65) Prior Publication Data

US 2003/0160576 A1 Aug. 28, 2003

(30) Foreign Application Priority Data

Jun. 8, 2001 (JP) ........................................ 2001-174720

(51) Int. Cl.[7] .............................................. G05F 1/00
(52) U.S. Cl. ........................ 315/291; 315/307; 315/224; 315/225
(58) Field of Search ................................. 315/291, 307, 315/224, 225, DIG. 2, DIG. 5, DIG. 7

(56) References Cited

U.S. PATENT DOCUMENTS 5,463,287 A * 10/1995 Kurihara et al. ............. 315/307
6,163,115 A * 12/2000 Ishizuka ....................... 315/308

* cited by examiner

Primary Examiner—Tuyet T. Vo
(74) Attorney, Agent, or Firm—Jay H. Maioli (57) ABSTRACT

A discharge lamp lighting device for lighting a discharge lamp includes an ignitor for applying a starting voltage to the discharge lamp at the time of starting and thus lighting the discharge lamp; a voltage detection circuit for detecting a voltage of the discharge lamp; and a current control circuit section for controlling a current supplied to the discharge lamp on the basis of the detection by the voltage detection circuit, wherein the current control circuit section, after ignition, starts controlling the current supplied to the discharge lamp on the basis of the detection result by the voltage detection circuit and continuously increases the current supplied to the discharge lamp at a predetermined rate. Thus, a discharge lamp lighting device which is inexpensive and highly reliable and enables a longer lifetime of the discharge lamp is provided.

7 Claims, 9 Drawing Sheets

DISCHARGE LAMP IGNITER DEVICE AND PROJECTOR DEVICE

TECHNICAL FIELD

This invention relates to a discharge lamp lighting device for lighting a discharge lamp, and a projector device.

BACKGROUND ART

Discharge lamps are currently used in various fields, for example, as a light source of an LCD projector device or the like. In a conventional current control method at the time of lighting such a discharge lamp, immediately after ignition when a lamp lighting switch is turned on, the current is fixed at a magnitude approximately 1.5 to 2 times the magnitude of the steady-state current of the discharge lamp, and after the lapse of a predetermined time, that is, when the discharge state of the discharge lamp is stabilized and the voltage of the discharge lamp is raised to a predetermined level, the current is reduced and the steady-state current is gradually restored.

However, in the current control method as described above, since a large current which is greater than the steady-state current flows through the discharge lamp every time the discharge lamp is lit, the electrodes of the discharge lamp are quickly exhausted, shortening the lifetime of the discharge lamp.

To prevent the shortening of the lifetime of the discharge lamp, the electrodes of the discharge lamp must be less exhausted. For this, the preset value at which the current is fixed after ignition may be lowered.

However, the larger quantity of current is supplied to the discharge lamp, the faster the discharge state of the discharge lamp is stabilized. Therefore, if the preset value at which the current is fixed after ignition is lowered, the rise in voltage of the discharge lamp becomes too slow and it takes long to stabilize the discharge lamp.

It may be considered to dividedly control the current on several stages after ignition. In this case, however, the current control circuit is complicated, increasing the cost of discharge lamp lighting device rises and lowering its reliability.

Thus, a discharge lamp lighting device which is inexpensive and highly reliable and enables a longer lifetime of a discharge lamp has not been realized yet.

DISCLOSURE OF THE INVENTION

In view of the foregoing status of the art, it is an object of the present invention to provide a discharge lamp lighting device which is inexpensive and highly reliable and enables a longer lifetime of a discharge lamp, and a projector device.

In order to achieve the above-described object, a discharge lamp lighting device for lighting a discharge lamp according to the present invention comprises: starting means for applying a starting voltage to the discharge lamp at the time of starting and thus lighting the discharge lamp; voltage detection means for detecting a voltage of the discharge lamp; and current control means for controlling a current supplied to the discharge lamp on the basis of the result of detection at the voltage detection means; wherein the current control means, after ignition, starts controlling the current supplied to the discharge lamp on the basis of the result of detection at the voltage detection means and continuously increases the current supplied to the discharge lamp at a predetermined rate of increase to a predetermined current value larger than a steady-state current of the discharge lamp.

The discharge lamp lighting device according to the present invention constituted as described above has the current control means for controlling a current supplied to the discharge lamp on the basis of the result of detection at the voltage detection means, and this control means performs control to continuously change the quantity of current supplied to the discharge lamp after ignition at a predetermined rate of increase to a predetermined current value larger than a steady-state current of the discharge lamp on the basis of the result of detection of the voltage of the discharge lamp.

That is, in this discharge lamp lighting device, after ignition when lighting the discharge lamp, the quantity of current is continuously changed at a predetermined rate of increase to a predetermined current value larger than a steady-state current of the discharge lamp and the current is thus supplied to the discharge lamp.

To this end, voltage correction setting means for correcting the result of detection from the voltage detection means is provided in the current control means so that the current supplied to the discharge lamp is controlled on the basis of the detected voltage corrected by this voltage correction setting means. This voltage correction setting means performs correction to continuously decrease the detected voltage after the ignition at a predetermined rate of decrease from a predetermined voltage value, thus enabling continuous change in the current supplied to the discharge lamp at a predetermined rate of increase.

Moreover, power setting control means for controlling a target power value of power setting means which controls the current supplied to the discharge lamp is provided in the current control means. This power setting control means performs control to continuously increase the target power value after the ignition at a predetermined rate of increase, thus enabling continuous change in the current supplied to the discharge lamp at a predetermined rate of increase.

In this discharge lamp lighting device, by thus controlling the quantity of current, the time during which a large current larger than the steady-state current flows through the discharge lamp is significantly reduced, compared with the conventional discharge lamp lighting device.

Moreover, in this discharge lamp lighting device, by thus controlling the quantity of current, the current supplied to the discharge lamp is gradually increased and therefore the electrodes of the discharge lamp are gradually warmed up. As a result, heat load on the electrodes is reduced and thermal fatigue of the electrodes is reduced, thus restraining the exhaustion of the electrodes.

Furthermore, a projector device which projects light emitted from a discharge lamp to outside can be constituted by using the discharge lamp lighting device as described above. This projector device may be a projector device which modulates light emitted from the discharge lamp on the basis of an inputted image signal and emits the modulated light.

Also in the case of the projector device, similar to the discharge lamp lighting device, since the time during which a large current larger than the steady-state current flows through the discharge lamp is significantly reduced and the current supplied to the discharge lamp is gradually increased, the electrodes of the discharge lamp are gradually warmed up. Therefore, heat load on the electrodes is reduced and thermal fatigue of the electrodes is reduced, thus restraining the exhaustion of the electrodes.

BEST MODE FOR CARRYING OUT THE INVENTION

The best mode for carrying out the invention will now be described with reference to the drawings.

Figure 1:
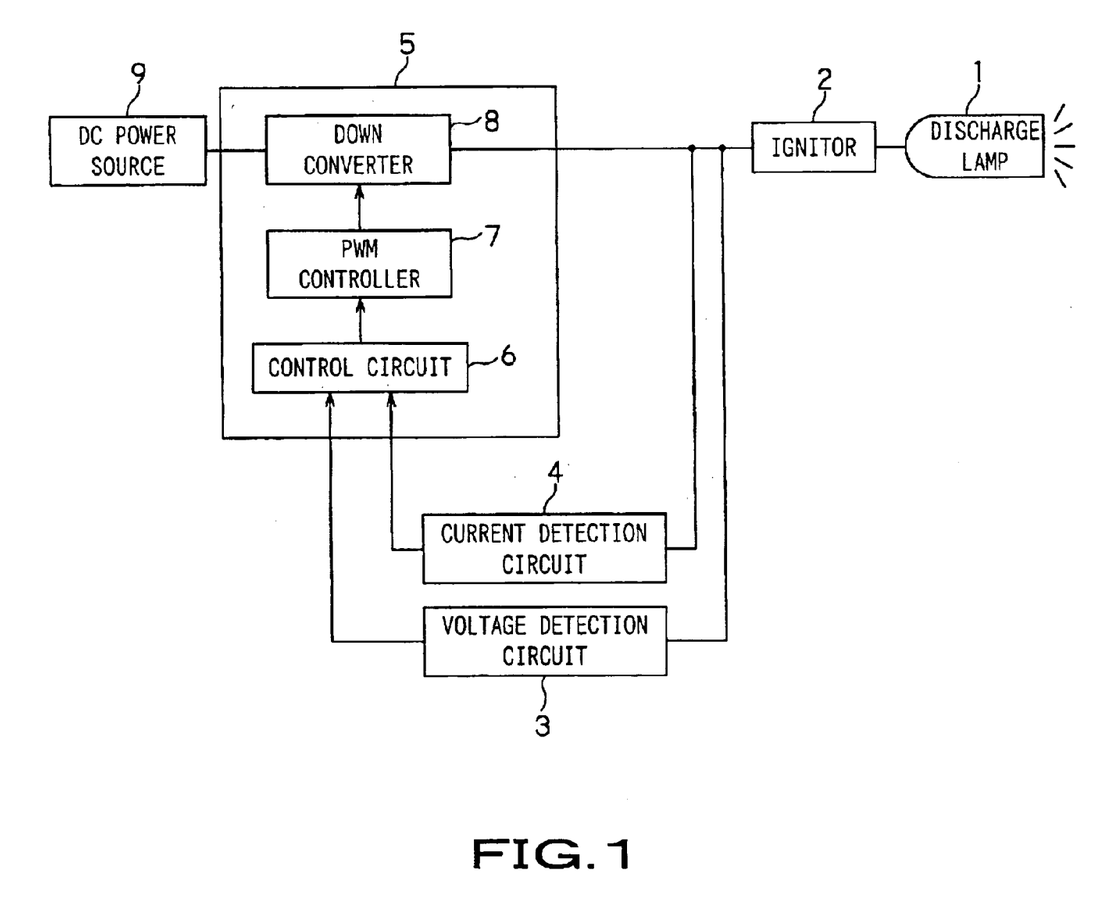
FIG. 1 is a block diagram showing the schematic structure of an embodiment of a discharge lamp lighting device to which the present invention is applied.

FIG. 1 is a block diagram showing the schematic structure of an embodiment of a discharge lamp lighting device to which the present invention is applied.

The discharge lamp lighting device to which the present invention is applied has an ignitor 2 as starting means for applying a starting voltage to a discharge lamp 1 at the time of starting and thus lighting the discharge lamp 1, a voltage detection circuit 3 as voltage detection means for detecting a voltage applied to the discharge lamp 1, a current detection circuit 4 as current detection means for detecting a current flowing through the discharge lamp 1, and a current control circuit section 5 as current control means for controlling the current flowing through the discharge lamp 1 (or controlling power supplied to the discharge lamp 1) on the basis of the result of detection at the voltage detection means, as shown in FIG. 1. The current control circuit section 5 is constituted by connecting a control circuit 6, a PWM controller 7 and a down converter 8 in this order.

The input terminal of the down converter 8 is connected with a DC power source 9, as shown in FIG. 1, so that a current is supplied to the discharge lamp lighting device. As the DC power source 9, for example, a power source which outputs a voltage of approximately 300 to 400 V with an active filter or the like may be used.

The output terminal of the down converter 8 is connected with the input terminal of the ignitor 2, so that the direct current supplied from the DC power source 9 is controlled and converted to an appropriate magnitude through the down converter 8 and then supplied to the ignitor 2.

The output terminal of the ignitor 2 is connected with the input terminal of the discharge lamp 1, so that the direct current flowing from the down converter 8 to the ignitor 2 is supplied directly to the discharge lamp 1.

Figure 2:
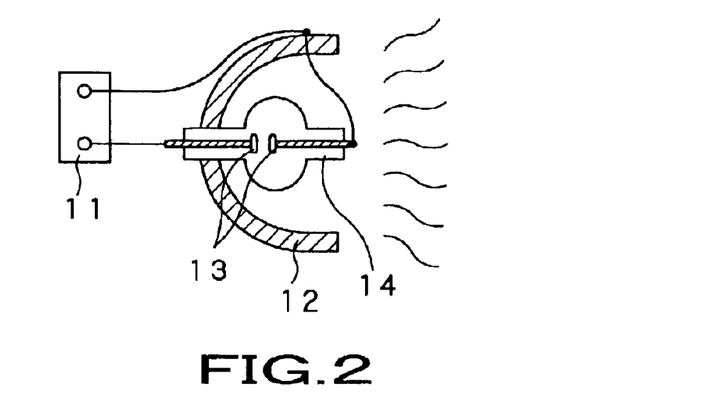
FIG. 2 is a schematic sectional view showing an exemplary structure of a discharge lamp.

The discharge lamp 1 has a connector 11, a reflector 12, electrodes 13, and a heat-resistant glass 14 covering the electrodes 13, as shown in FIG. 2. An ignition voltage, a lamp current and the like are supplied from the connector 11 to the electrodes 13. Various gases are sealed within the heat-resistant glass 14 and the electrodes 13 discharge within the heat-resistant glass 14.

The discharge lamp to which the discharge lamp lighting device according to the present invention can be applied is not particularly limited. Any discharge lamp in which a voltage changes before stabilization, for example, a metal halide lamp, a high-pressure mercury lamp, or a xenon lamp, may be used.

The voltage detection circuit 3 and the current detection circuit 4 are arranged in a branched manner between the output terminal of the down converter 8 and the input terminal of the ignitor 2. The output terminal of the voltage detection circuit 3 and the output terminal of the current detection circuit 4 are connected to the input terminal of the control circuit 6 in the current control circuit section 5.

The current control circuit section 5 is adapted for controlling a current supplied to the discharge lamp 1 after ignition. As described above, the current control circuit section 5 is constituted by connecting the control circuit 6, the PWM controller 7 and the down converter 8 in this order. The control circuit 6 starts controlling the current supplied to the discharge lamp 1 on the basis of the result of detection at the voltage detection means, and controls the current on the basis of the result of detection at the voltage detection circuit 3 so as to realize an appropriate quantity of current supplied to the discharge lamp 1.

In this discharge lamp lighting device, the current supplied to the discharge lamp 1 is controlled by controlling the voltage applied to the discharge lamp 1. That is, in this discharge lamp lighting device, the voltage applied to the discharge lamp 1 is changed and controlled, thereby controlling the quantity of current supplied to the discharge lamp 1.

Specifically, the current control circuit section 5 is adapted for controlling the power supplied to the discharge lamp 1 at a predetermined constant value. The operation of the down converter 8 is controlled so that a value (detected power value) obtained by multiplying the detected voltage at the voltage detection circuit 3 by the detected current at the current detection circuit 4 is a predetermined target power value. However, the resistance value of the discharge lamp 1 immediately after ignition is very low and the detected voltage value is lowered, thus excessively increasing the current value for supplying the predetermined power. Therefore, by correcting the detected voltage or controlling the target power setting value, the current immediately after ignition is limited to, for example, a magnitude approximately 1.5 to 2 times the magnitude of the steady-state current.

Figure 3:
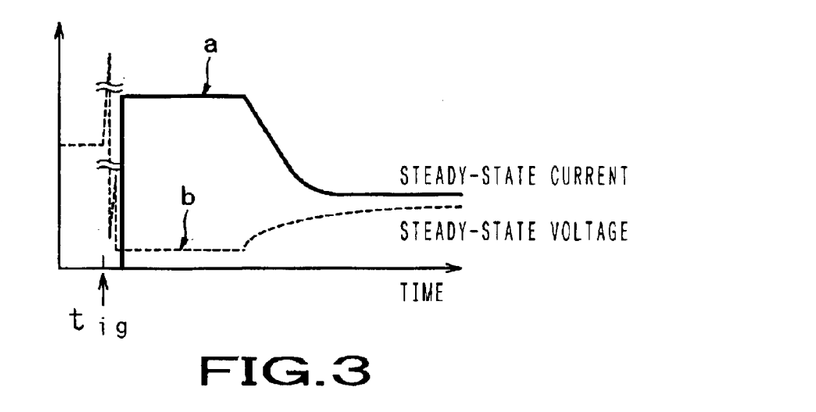
FIG. 3 is a graph showing the state of current and voltage in a conventional discharge lamp lighting device.

In the conventional discharge lamp lighting device, control is performed so that the magnitude of a current supplied to the discharge lamp (lamp current "a" indicated by a solid line in FIG. 3) is fixed at a magnitude approximately 1.5 to 2 times the magnitude of a steady-state current in the steady state of the discharge lamp, immediately after ignition (time point $t_{ig}$) when lighting the discharge lamp, and thus the supply of the current to the discharge lamp is continued, as shown in FIG. 3. When the discharge state of the discharge lamp is stabilized after the lapse of a predetermined time and the voltage of the discharge lamp (lamp voltage "b" indicated by a broken line in FIG. 3) is raised to a predetermined level, the current supplied to the discharge lamp is reduced and the steady-state current is gradually restored.

In such a current control method, however, since a large current which is larger than the steady-state current flows through the discharge lamp every time the discharge lamp is lit, the time during which an excessively large current flows through the discharge lamp becomes longer. Therefore, the electrodes of the discharge lamp are quickly exhausted, shortening the lifetime of the discharge lamp.

To prevent the shortening of the lifetime of the discharge lamp, the electrodes of the discharge lamp must be less exhausted. For this, the preset value at which the current is fixed after ignition may be lowered.

However, the more power is supplied to the discharge lamp, the faster the discharge state of the discharge lamp is stabilized. Therefore, if the preset value at which the current is fixed after ignition is lowered, the rise in voltage of the discharge lamp becomes too slow and it takes long to stabilize the discharge lamp.

It may be considered to dividedly control the current on several stages after ignition. In this case, however, the current control circuit is complicated, increasing the cost of discharge lamp lighting device rises and lowering its reliability.

In order to overcome such inconvenience, in this discharge lamp lighting device, control is performed so that the discharge lamp 1 is stabilized in a time equivalent to the time required in the conventional discharge lamp lighting device and the time during which a large current flows through the discharge lamp 1 is reduced.

Figure 4:
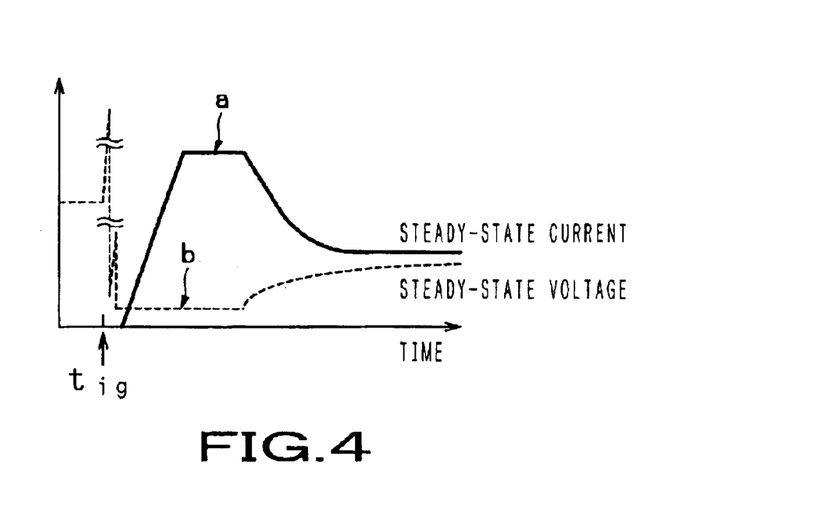
FIG. 4 is a graph showing the state of current and voltage in the embodiment of the discharge lamp lighting device according to the present invention.

Specifically, at the current control circuit section 5 in this discharge lamp lighting device, the quantity of current (lamp current "a" indicated by a solid line in FIG. 4) supplied to the is continuously changed at a predetermined rate of increase after ignition (time point $t_{ig}$), as shown in FIG. 4.

When the quantity of current supplied to the discharge lamp 1 reaches a predetermined value (hereinafter referred to as maximum current value) which is larger than the steady-state current of the discharge lamp 1, that is, when the discharge state of the discharge lamp 1 is stabilized and the voltage (lamp voltage "b" indicated by a broken line in FIG. 4) of the discharge lamp 1 is raised to a predetermined level, the quantity of current is decreased at a predetermined rate of decrease to the steady-state current of the discharge lamp 1 and then maintained at this level.

In this discharge lamp lighting device, by thus controlling the quantity of current, the time during which a large current larger than the steady-state current flows through the discharge lamp 1 can be significantly reduced, compared with the conventional discharge lamp lighting device.

Moreover, in this discharge lamp lighting device, by thus controlling the quantity of current, the current supplied to the discharge lamp 1 is gradually increased and therefore the electrodes 13 of the discharge lamp 1 are gradually warmed up. As a result, heat load on the electrodes 13 can reduced and thermal fatigue of the electrodes 13 can reduced, thus restraining the exhaustion of the electrodes 13. Therefore, in this discharge lamp lighting device, the shortening of the lifetime of the discharge lamp 1 due to the exhaustion of the electrodes 13 can be prevented and the discharge lamp 1 with a longer lifetime can be realized.

The maximum current value and the rate of increase in current are not particularly limited and may be properly set in accordance with various conditions such as the type of the discharge lamp 1.

Compared with the conventional discharge lamp lighting device in which a predetermined large current is caused to flow for a predetermined time after ignition, the time required for stabilizing the discharge state of the discharge lamp 1 is only several seconds at most, though depending on various conditions such as the type of the discharge lamp 1, the maximum current value and the rate of increase in current. This causes no problem in practical application of the discharge lamp 1.

That is, in this discharge lamp lighting device, the discharge lamp 1 can be stabilized in a time equivalent to the time required in the conventional discharge lamp lighting device.

As the maximum current value is reached, the maximum current value may be maintained for a predetermined time and then the quantity of current may be decreased. Alternatively, the quantity of current may be decreased when the maximum current level is reached. This, too, may be properly set in accordance with various conditions such as the type of the discharge lamp 1, correlatively with the rate of increase in current.

Figure 5:
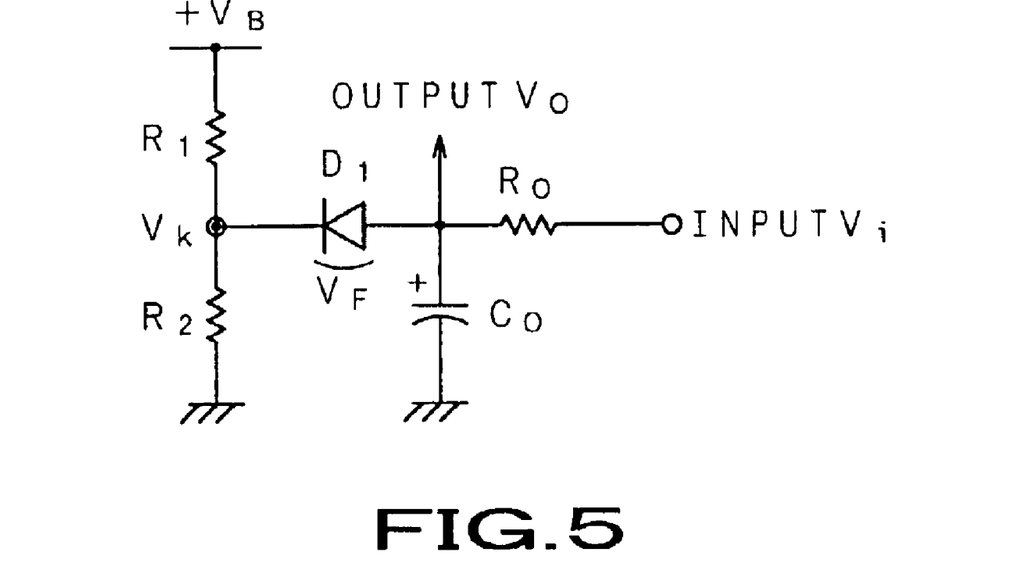
FIG. 5 is a structural view showing an exemplary structure of a control circuit.

The control circuit 6 of the current control circuit section 5 may have, for example, a structure made up mainly of a circuit as shown in FIG. 5.

The circuit shown in FIG. 5 is an essential part of the control circuit 6. An input $V_i$ to this circuit shown in FIG. 5 is a voltage based on the result of detection at the voltage detection circuit 3, as will be described later. When this input voltage $V_i$ is gradually raised from 0 to an output voltage $V_B$ of the DC power source 9, an output $V_o$ from the circuit shown in FIG. 5 can be limited to a value "$V_k+V_F$" obtained by adding a divided voltage $V_k$ ($V_k=V_B \times R_2/(R_1+R_2)$) divided from the power-supply voltage $V_B$ by resistors $R_1$ and $R_2$, to a forward voltage drop $V_F$ of a diode $D_1$. The output $V_o$ is a voltage for controlling the voltage supplied to the discharge lamp 1 or for setting the power supplied to the discharge lamp 1. More specifically, the circuit of FIG. 5 is equivalent to a power setting control circuit 60, which will be described later with reference to FIGS. 7, 10 and 11.

Figure 6:
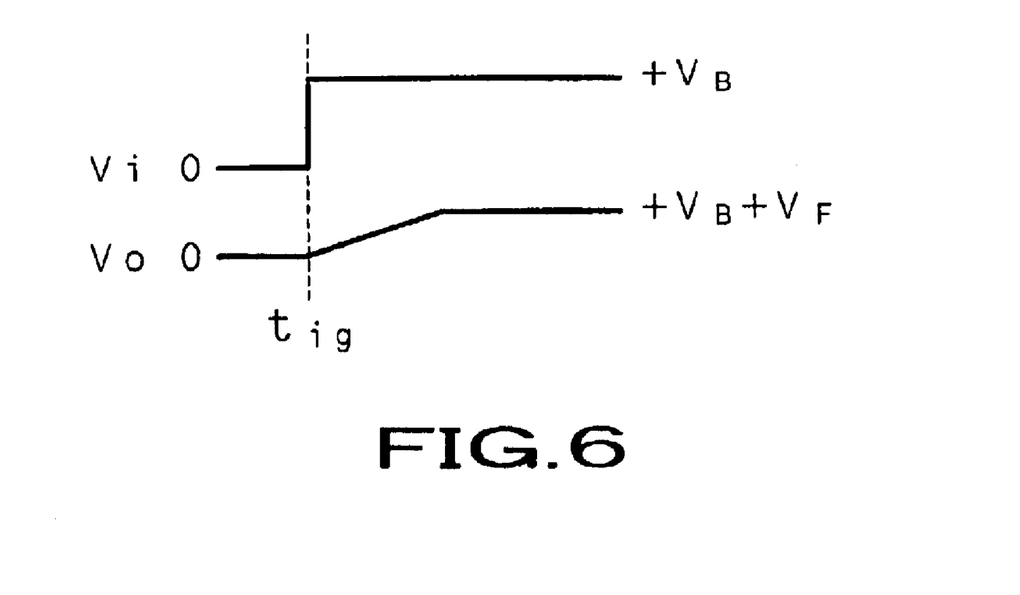
FIG. 6 shows the transition of an input $V_i$ to a control circuit 6 and an output $V_o$ from the control circuit 6.

The values of the resistors $R_1$ and $R_2$ can be freely set and changed. Therefore, in the circuit shown in FIG. 5, when the input $V_i$ to the circuit, that is, the result of detection at the voltage detection circuit 3, is gradually raised from 0 to the output voltage $V_B$ of the DC power source 9, the output Vo, that is, the voltage corresponding to the voltage supplied to the discharge lamp 1, can be controlled to be at a desired value "$V_k+V_F$" by setting the values of the resistors $R_1$ and $R_2$ at predetermined values which satisfy the conditions of $R_1<R_0$ and $R_2<R_0$ with respect to a resistor $R_0$, as shown in FIG. 6. Therefore, the upper limit of the output Vo, that is, the voltage corresponding to the voltage applied to the discharge lamp 1, can be controlled.

Since the current supplied to the discharge lamp 1 can be controlled by controlling the voltage applied to the discharge lamp 1 as described above, the upper limit of the current supplied to the discharge lamp 1 can be controlled by controlling the upper limit of the voltage applied to the discharge lamp 1.

By changing the values of the resistor $R_0$ and a capacitor $C_0$, the rate of increase in output $V_o$ from the circuit shown in FIG. 5, of the control circuit 6, can be set at a predetermined rate of increase. Therefore, the rate of increase in the current supplied to the discharge lamp 1 can be controlled to be a desired rate of increase by controlling the rate of increase in the voltage applied to the discharge lamp 1.

Moreover, since the essential structure of the control circuit 6 can be constituted by a simple circuit as shown in FIG. 5, this discharge lamp lighting device has high reliability and can be produced inexpensively.

The output $V_o$ controlled at the control circuit 6 as described above is inputted to the PWM controller 7 and is used as a control signal for the PWM controller 7. The PWM controller 7 controls the duty factor of ON/OFF operation of a semiconductor switch provided in the PWM controller 7 in accordance with the output $V_o$ inputted thereto from the control circuit 6, and inputs this controlled signal to the down converter 8.

The down converter 8 controls the current value of the direct current supplied from the DC power 9 at a predetermined value on the basis of the signal inputted thereto from the PWM controller 7, and then outputs the controlled current value.

Therefore, in this discharge lamp lighting device, a current controlled to continuously change at a desired rate of increase by feedback control as described above can be supplied to the discharge lamp 1.

The structure shown in FIG. 5 is an example of the essential structure of the control circuit 6. The control circuit 6 is not limited to this and various structures having the above-described function can be used.

As described above in detail, a discharge lamp lighting device which has an inexpensive structure and high reliability and enables a longer lifetime of the discharge lamp 1 can be realized.

The operation of the above-described discharge lamp lighting device will now be described.

First, ignition is carried out. That is, a predetermined direct current is supplied from the DC power source 9 to the ignitor 2 to charge a capacitor in the ignitor 2. When the charging voltage of the capacitor reaches a predetermined voltage, a high voltage is generated and applied to the discharge lamp 1. The application of this high voltage causes dielectric breakdown between the electrodes 13 of the discharge lamp 1. As a result, the charging load of the capacitor in the ignitor 2 is discharged through the discharge lamp 1 and power is continuously supplied to the discharge lamp 1 to light the discharge lamp 1.

The lighting of the discharge lamp 1 is detected as a change in voltage at the voltage detection circuit 3 and this result of detection is inputted to the control circuit 6 of the current control circuit section 5.

After the discharge lamp 1 is lit, the current supplied to the discharge lamp 1 is detected by the current detection circuit 4. The result of detection at the current detection circuit 4 is inputted to the control circuit 6 of the current control circuit section 5.

Moreover, after the discharge lamp 1 is lit, the voltage applied to the discharge lamp 1 is detected by the voltage detection circuit 3. The result of detection at the voltage detection circuit 3 is inputted to the control circuit of the current control circuit section 5.

The control circuit 6 of the current control circuit section 5 starts controlling the current supplied to the discharge lamp 1 after ignition on the basis of the result of detection inputted thereto from the voltage detection circuit 3, and continuously changes the current supplied to the discharge lamp 1 at a predetermined rate of increase.

When the current value reaches the maximum current value, that is, when the discharge state of the discharge lamp 1 is stabilized and the voltage of the discharge lamp 1 is raised to a predetermined level, the quantity of current is decreased at a predetermined rate of decrease to the steady-state current of the discharge lamp 1 and then maintained.

Then, a control signal controlled at the control circuit 6 as described above is inputted to the PWM controller 7 and is used as a control signal for the PWM controller 7. The PWM controller 7 controls the duty factor of ON/OFF operation of the semiconductor switch provided in the PWM controller 7 in accordance with the output $V_0$ inputted thereto from the control circuit 6, and inputs this controlled signal to the down converter 8.

The down converter 8 controls the current value of the direct current supplied from the DC power source 9 at a predetermined value on the basis of the control signal inputted thereto from the PWM controller 7, and outputs the controlled current value to the discharge lamp 1 via the ignitor 2. Thus, the lighting of the discharge lamp 1 is maintained.

In the discharge lamp lighting device constituted as described above, the time during which a large current larger than the steady-state current flows through the discharge lamp can be significantly reduced, compared with the conventional discharge lamp lighting device.

Moreover, heat load on the electrodes and hence heat fatigue of the electrodes can be reduced, restraining exhaustion of the electrodes to the minimum level. Therefore, in this discharge lamp lighting device, shortening of the lifetime of the discharge lamp due to the exhaustion of the electrodes can be prevented.

Since the current control means in this discharge lamp lighting device can be realized with a simple structure, the discharge lamp lighting device is highly reliable and can be produced inexpensively.

Thus, according to the present invention, a discharge lamp lighting device which is inexpensive and highly reliable and enables a longer life of the discharge lamp can be provided.

Figure 7:
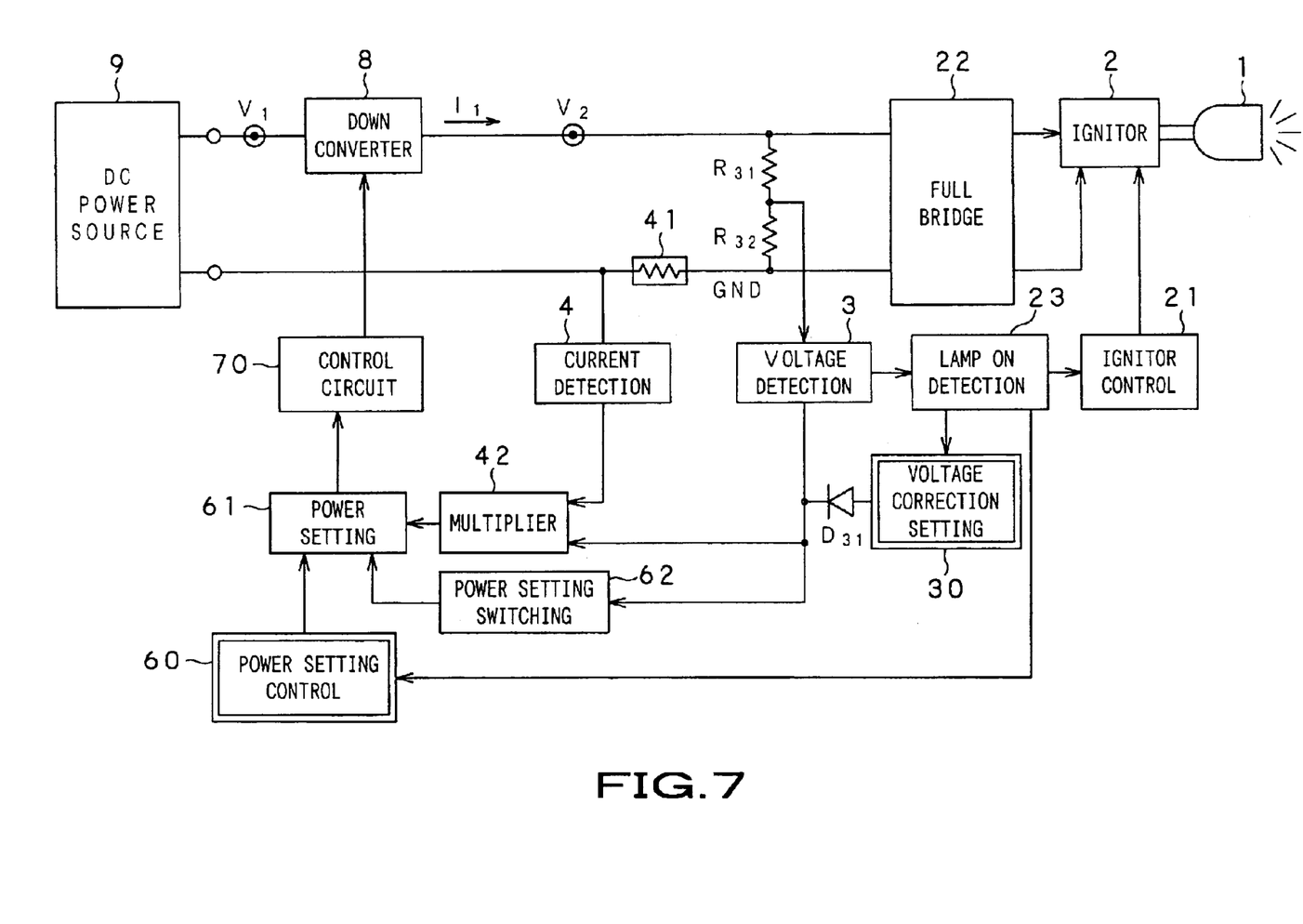
FIG. 7 is a block diagram showing an exemplary structure of the embodiment of the discharge lamp lighting device to which the present invention is applied.

FIG. 7 is a block diagram showing a more specific exemplary structure of the discharge lamp lighting device shown in FIG. 1. The parts shown in FIG. 7 corresponding to the parts shown in FIG. 1 are denoted by the same numerals.

In FIG. 7, a DC voltage of approximately 300 to 400 V, specifically, for example, a DC voltage of 370 V, is outputted from the DC power source 9 constituted by an active filter or the like, and is fed to the down converter 8. The down converter 8, which is a step-down switching power source, switches the input DC voltage, for example, at a frequency of approximately 50 to 100 kHz, and then smoothes the input DC voltage, thereby carrying out voltage conversion (voltage drop) to a DC voltage of, for example, approximately 50 to 100 V, which is necessary for ordinary lighting of the lamp (discharge lamp). The switching operation of this down converter 8 is controlled at constant output power as pulse width control and frequency control are carried out by a control circuit 70 (equivalent to the PWM controller 7 of FIG. 1 or the like).

The output from the down converter 8 is fed to the ignitor 2 of the ignition section via a full bridge 22. Voltage-division resistors $R_{31}$, $R_{32}$ for voltage detection and a resistor 41 for current detection are provided between the down converter 8 and the full bridge 22.

The ignitor 2 has an ignition output transformer (not shown). When lighting the lamp, a pulse voltage is supplied to its primary winding and a pulse signal of approximately 5 to 20 kV is generated and outputted from its secondary winding (output winding). The output from this ignitor 2 is supplied to the lamp (discharge lamp) 1. An ignitor control circuit 21 of FIG. 7 is adapted for stopping the ignition operation in accordance with detection of lighting of the lamp by ignition at a lamp ON detection circuit 23. This example of FIG. 7 represents a circuit structure for an AC lamp. In the case of a circuit structure for a DC lamp, the full bridge 22 is not necessary.

The voltage detection circuit 3 detects voltage-division outputs from the voltage-division resistors $R_{31}$, $R_{32}$ and sends the detected voltage output to a multiplier 42, a power setting switching circuit 62, and the lamp ON detection circuit 23. The detection output from the lamp ON detection circuit 23 is sent to a voltage correction setting circuit 30, the power setting control circuit 60, and the ignitor control circuit 21. The output terminal of the voltage correction setting circuit 30 is connected with the output terminal of the voltage detection circuit 3 via a diode $D_{31}$, so that the higher one of the output voltage+$V_F$ of the voltage correction setting circuit 30 (forward voltage drop of the diode $D_{31}$) and the detected voltage from the voltage detection circuit 3 is sent to the multiplier 42 and the power setting switching circuit 62.

The current detection circuit 4 detects the output current from the down converter 8 by detecting a voltage generated in the resistor 41 and then sends the detected output current to the multiplier 42. The multiplier 42 multiplies the detected voltage from the voltage detection circuit 3 by the detected current from the current detection circuit 4, thus calculating the output power from the down converter 8.

The outputs from the power setting control circuit 60, the power setting switching circuit 62 and the multiplier 42 are sent to the power setting circuit 61. The output from the power setting circuit 61 is sent as target power to the control circuit 70. As the control circuit 70 controls the switching operation (pulse width and the like) of the down converter 8, the output power from the down converter 8 is ultimately controlled to be the target power.

Either the voltage correction setting circuit 30 or the power setting control circuit 60 of FIG. 7 is controlled to continuously increase the current supplied to the discharge lamp after the ignition or after turning on the lamp, at a predetermined rate of increase to a predetermined current value larger than the steady-state current of the discharge lamp. Although both the voltage correction setting circuit 30 and the power setting control circuit 60 are shown in FIG. 7, at least one of these may be used and the other may be omitted. More specifically, either a structure consisting of the voltage correction setting circuit 30 and the diode $D_{31}$ or a structure consisting of the power setting control circuit 60 and the power setting switching circuit 62 may be used.

The multiplier 42, the voltage correction setting circuit 30, the power setting control circuit 60, the power setting circuit 61, the power setting switching circuit 62 and the like, shown in FIG. 7, are provided within the current control circuit section 5 of FIG. 1 and these can be considered to substantially correspond to the control circuit 6. The control circuit 70 of FIG. 7 substantially corresponds to the PWM circuit 7 of FIG. 1. However, the control circuit 70 is not limited to pulse width control and it controls the output current (or output power) from the down converter 8 by frequency control or by pulse width and frequency control.

A more detailed specific example of the structure of FIG. 7 and an exemplary operation thereof will now be described with reference to FIGS. 8 to 11.

Figure 8:
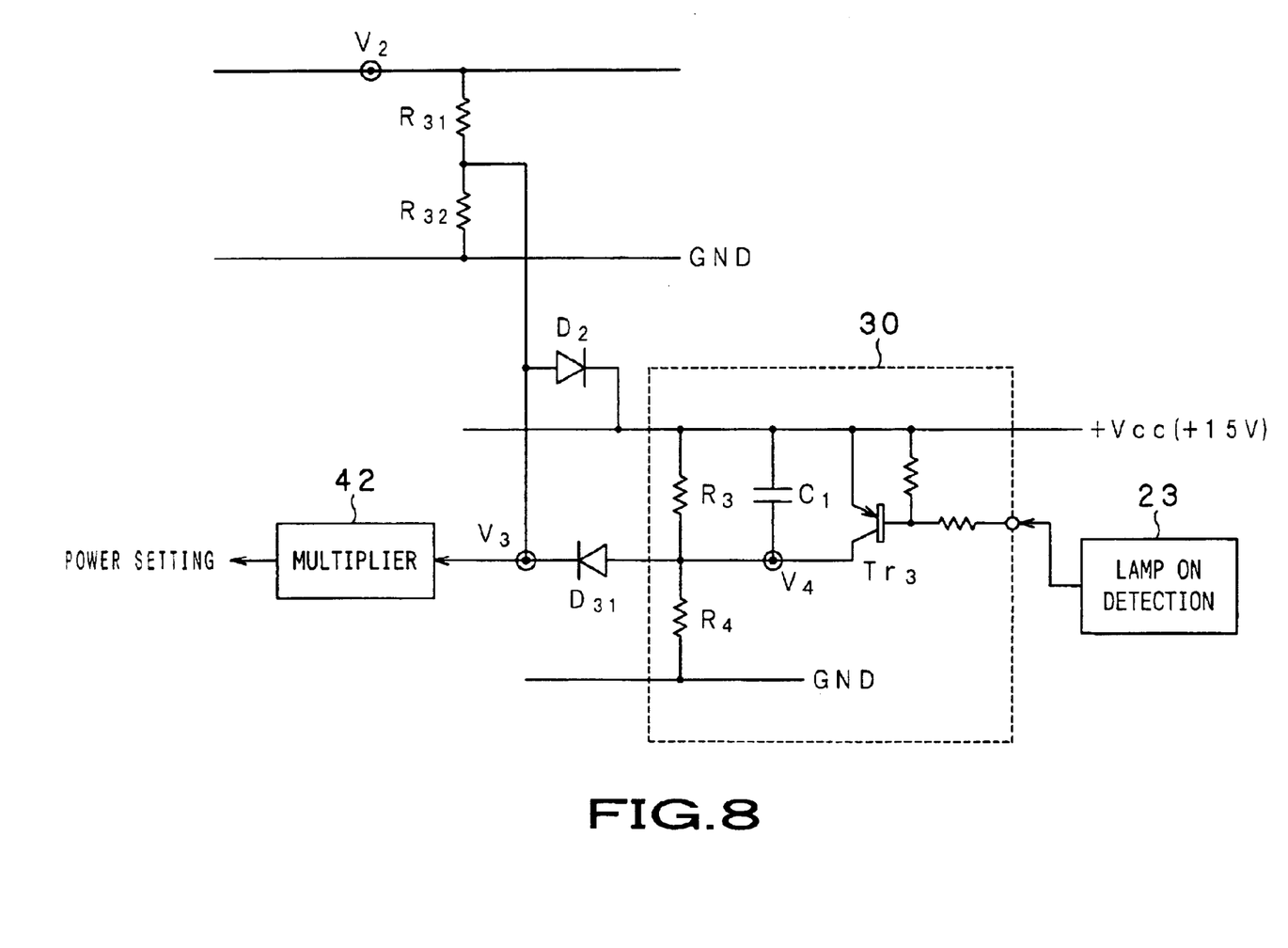
FIG. 8 is a block circuit diagram showing an exemplary circuit structure of an essential part in the case of performing control to gradually increase a current after turning on a lamp lighting switch by a voltage correction setting circuit of FIG. 7.
Figure 9:
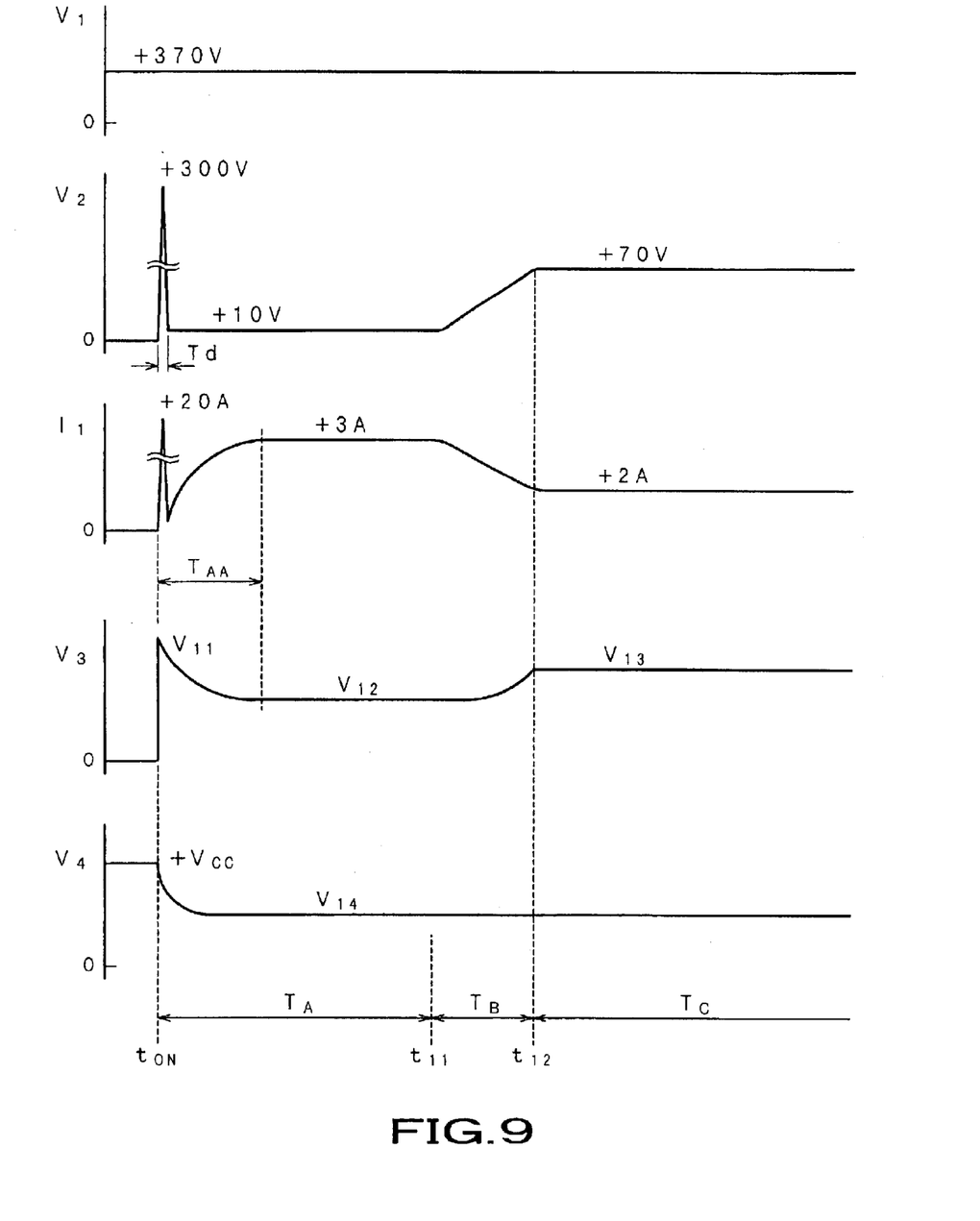
FIG. 9 shows waveforms for explaining the operation of the circuit of FIG. 8.

First, FIG. 8 is a block diagram showing an exemplary circuit structure of an essential part in the case where the voltage correction setting circuit 30 performs control to gradually increase the current of the discharge lamp at the time of turning on a lamp lighting switch or after the ignition. FIG. 9 shows waveforms for explaining the operations shown in FIG. 8. In this example, a voltage $V_1$ represents an output voltage from the DC power source 9 of FIG. 7, and a voltage $V_2$ and a current $I_1$ represent an output voltage and an output current from the down converter 8 of FIG. 7, respectively. A voltage $V_3$ represents a voltage detected by the voltage-division resistors $R_{31}$, $R_{32}$ and supplied to the multiplier 42 in FIG. 8, and a voltage $V_4$ represents an integral output voltage of a time-constant circuit in the voltage correction setting circuit 30.

Specifically, in FIG. 8, the connection point between the voltage-division resistors $R_{31}$, $R_{32}$ for voltage detection is connected with the anode of a diode $D_2$ for clamping and the cathode of the diode $D_{31}$. The cathode of the diode $D_2$ is connected with the +Vcc terminal of the circuit power source and the anode of the diode $D_{31}$ is connected with the connection point between voltage-division resistors $R_3$, $R_4$ in the voltage correction setting circuit 30. Therefore, as the voltage $V_3$ at the connection point between the voltage-division resistors $R_3$, $R_4$, one of the voltage-division detection voltage detected by the voltage-division resistors $R_{31}$, $R_{32}$, the anode voltage of the diode $D_2$, and the cathode voltage of the diode $D_{31}$, is supplied as the ultimate detected voltage to the multiplier 42. The circuit power-supply voltage +Vcc is set, for example, at +15 V, but it is not limited to this.

In the voltage correction setting circuit 30, the voltage-division resistors $R_3$, $R_4$ are inserted and connected between the +Vcc power-source terminal and an earth terminal (GND), and a capacitor $C_1$ is connected in parallel to the resistor $R_3$. The capacitor $C_1$ is connected between the emitter and the collector of a PNP transistor $TR_3$, and the base of the transistor $TR_3$ is supplied with the output from the lamp ON detection circuit 23. The output from the lamp ON detection circuit 23 is 0 V at the time of OFF and +Vcc (for example, +15 V) at the time of ON. Therefore, when the lamp is off, the transistor $TR_3$ is turn on to form a short circuit between both ends of the capacitor $C_1$, and after the lamp is turned on, the transistor $TR_3$ is turned off and electric charges are accumulated at the capacitor $C_1$.

In such a structure, as the output voltage $V_1$ from the DC power source 9 of FIG. 7, a predetermined DC voltage, for example, 370V, is outputted and supplied to the down converter 8 even before the lamp lighting switch is turned on. As the lamp lighting switch is turned on at time $t_{ON}$ in this state, the ignitor 2 starts the ignition operation as described above and the resistance value of the discharge lamp 1 is lowered, thus lowering the voltage supplied to the discharge lamp 1. The lamp ON detection circuit 23 of FIG. 7 detects this voltage drop and outputs a lamp ON detection signal, for example, a signal for rise from 0 V to +Vcc (for example, +15 V). This lamp ON detection signal is sent to the ignitor control circuit 21 of FIG. 7 and the ignition operation of the ignitor 2 is stopped. In this case, the output voltage $V_2$ from the down converter 8 reaches approximately 300 V in accordance with the ignition operation and then is normally lowered to approximately 10 V in a duration Td of approximately 100 microseconds, as shown in FIG. 9. In some cases, the lowering takes approximately 1 to 3 seconds. Similarly, the output current $I_1$ from the down converter 8 temporarily rises to approximately 20 A and then is lowered.

The lamp ON detection signal from the lamp ON detection circuit 23 in this case is also sent to the transistor $TR_3$ of the voltage correction setting circuit 30 of FIG. 8. As the transistor $TR_3$ is turned off and electric charges are accumulated at the capacitor $C_1$, the voltage $V_4$ at the connection point between the resistors $R_3$, $R_4$ in the voltage correction setting circuit 30 changes as shown in FIG. 9. In response to this, the ultimate detected voltage $V_3$ supplied to the multiplier 42 changes as shown in FIG. 9.

Specifically, at the time $t_{ON}$ when the lamp lighting switch is turned on, the voltage-division output voltage from the voltage-division resistors $R_{31}$, $R_{32}$ becomes higher, but the ultimate detected voltage $V_3$ is clamped at a predetermined clamp voltage $V_{11}$ by the diode $D_2$ for clamping. This clamp voltage is a voltage that is higher than the circuit power-supply voltage +Vcc (for example, +15 V) by the forward voltage drop $V_F$ of the diode $D_2$. That is, this clamp voltage is expressed as follows.

$$V_{11} + Vcc + V_F$$

After that, as the transistor $TR_3$ in the voltage correction setting circuit 30 is turned off and electric charges begin to be accumulated at the capacitor $C_1$, the voltage $V_4$ at the connection point between the resistors $R_3$, $R_4$ is gradually lowered on the basis of the time constant corresponding to the resistance values of the resistors $R_3$, $R_4$ and the capacitance value of the capacitor $C_1$. Specifically, the voltage $V_4$ at the connection point between the resistors $R_3$, $R_4$ changes from the circuit power-supply voltage +Vcc (for example, +15 V) at the time $t_{ON}$ when the lamp lighting switch is turned on, to a divided voltage $V_{14}$ $(= +Vcc \times (R_{32}/(R_{31}+R_{32})))$ obtained by dividing the voltage +Vcc at the resistors $R_3$, $R_4$ after a predetermined time $T_{AA}$ defined by the time constant. The voltage $V_3$ in this case appears as the voltage $V_4$ passes through the diode $D_{31}$ and therefore it is a voltage that is lower than the voltage $V_4$ by the forward voltage drop $V_F$ of the diode $D_{31}$. A voltage $V_{12}$ after the lapse of the predetermined time $T_{AA}$ is expressed as follows.

$$V_{12} = +Vcc \times (R_{32}/(R_{31}+R_{32})) - V_F$$

This voltage $V_3$ is sent as the ultimate detected voltage to the multiplier 42 and is multiplied by the detected current output from the current detection circuit 4 of FIG. 7, thus becoming target power for power control. Therefore, when the detected voltage output which is gradually lowered during the time $T_{AA}$ is sent to the multiplier 42, the down converter 8 is controlled so that the output current $I_1$ is gradually increased as shown in FIG. 9, via the control circuit 70 from the power setting circuit 61 of FIG. 7. The output current $I_1$ is controlled so that the current supplied to the discharge lamp 1 is continuously increased to 1.5 times the steady-state current of, for example, +2 A, that is, it is continuously increased to +3 A. These current values are only examples and the present invention is not limited to these numerical values.

In FIG. 9, a period $T_A$ from the time $t_{ON}$ when the lamp lighting switch is turned on to the time $t_{11}$ is a lamp voltage constant period in which the lamp has a low resistance value. This period has a duration of, for example, approximately 20 to 90 seconds. A period $T_B$ from the time $t_{11}$ to the time 12 is a lamp voltage build-up period. The total duration of the periods $T_A$ and $T_B$ is, for example, approximately 30 seconds to 2 minutes. However, the present invention is not limited to these numerical values. A period $T_C$ after the time $t_{12}$ is a steady-state period in which the discharge state of the lamp is stable. The output voltage $V_2$ from the down converter 8 in the steady state is, for example, +70 V, and the output current $I_1$ is +2 A. As a matter of course, the present invention is not limited to these numerical values. As the voltage detection output $V_3$ to the multiplier 42, a voltage $V_{13}$ in the steady-state is voltage detected at the voltage-division resistors $R_{31}$, $R_{32}$ for voltage detection. That is, the voltage $V_{13}$ is expressed as follows.

$$V_{13} = V_2 \times (R_{32}/(R_{31}+R_{32}))$$

According to the specific example described with reference to FIGS. 8 and 9, the time during which a large current larger than the steady-state current flows through the discharge lamp can be reduced, and heat burden on the electrodes and hence thermal fatigue of the electrodes can be reduced. Therefore, exhaustion of the electrodes can be restrained to the minimum level and shortening of the lifetime of the discharge lamp due to the exhaustion of the electrodes can be prevented.

Figure 10:
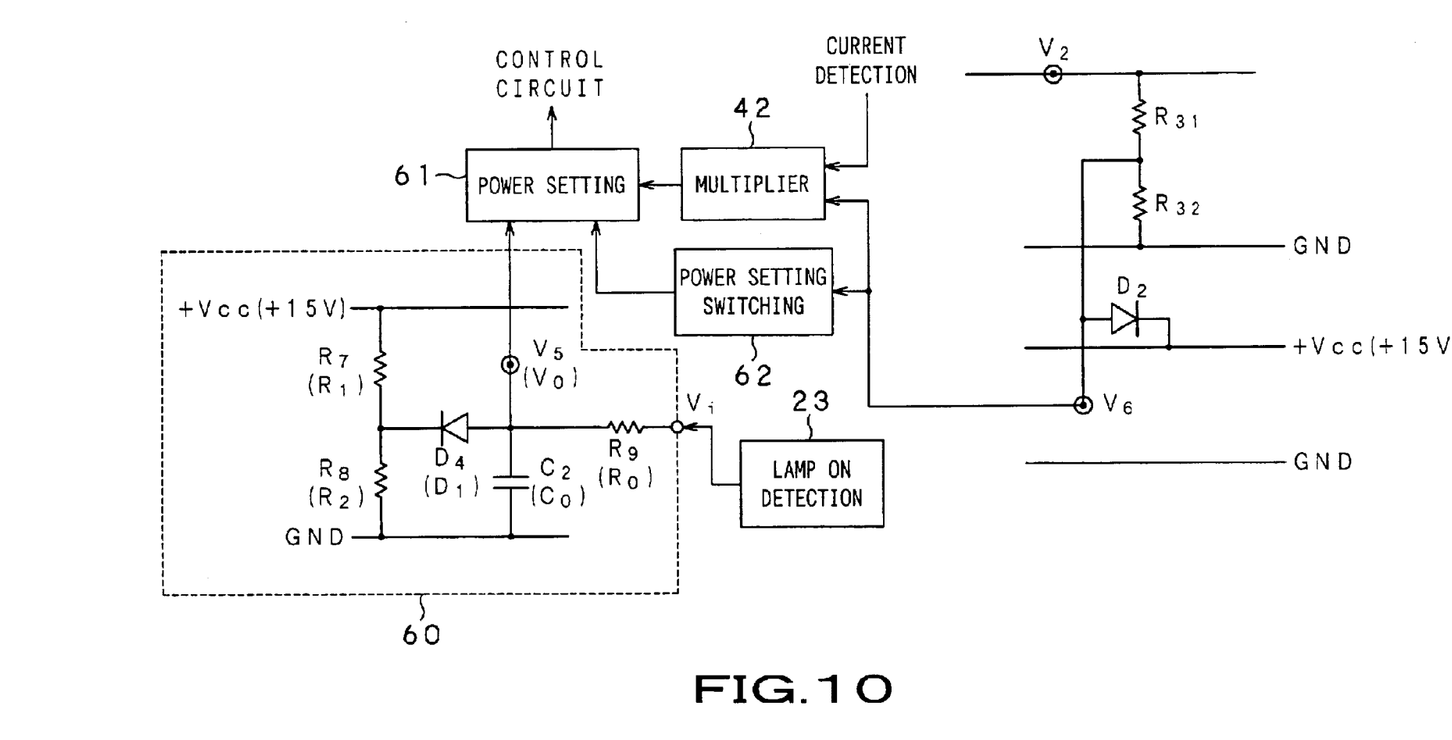
FIG. 10 is a block circuit diagram showing an exemplary circuit structure of an essential part in the case of performing control to gradually increase a current after turning on the lamp lighting switch by a power setting control circuit of FIG. 7.
Figure 11:
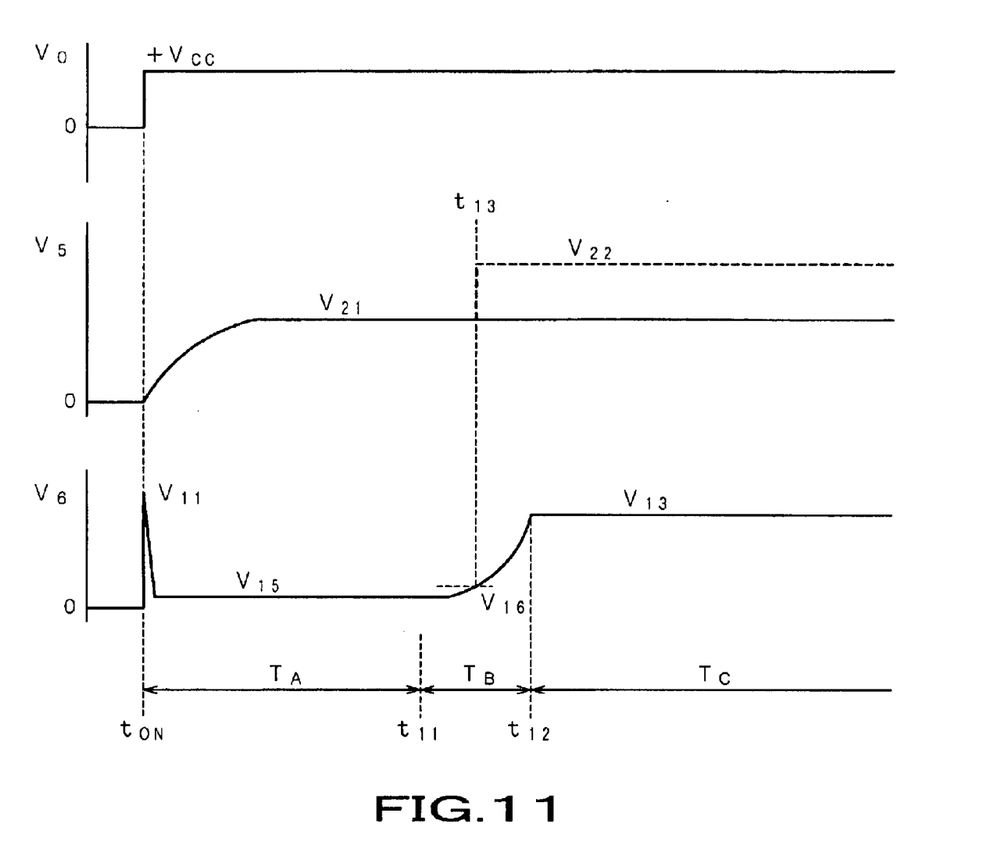
FIG. 11 shows waveforms for explaining the operation of the circuit of FIG. 10.

FIGS. 10 and 11 explain a specific example of control to gradually increase the lamp of the discharge lamp after the ignition by the power setting control circuit 60 of FIG. 7. FIG. 10 is a block circuit diagram showing a specific example of the power setting control circuit 60 and its peripheral circuit. FIG. 11 shows waveforms for explaining the operation of the circuits of FIG. 10.

In FIG. 10, the connection points between the voltage-division resistors $R_{31}$, $R_{32}$ for voltage detection is connected with the anode of the diode $D_2$ for clamping, and the cathode of the diode $D_2$ id connected with the +Vcc terminal of the circuit power source. In this specific example, the voltage correction setting circuit 30 is not used. A voltage $V_6$ at the connection point between the voltage-division resistors $R_3$, $R_4$ is either a voltage-division detection voltage detected at the voltage-division resistors $R_{31}$, $R_{32}$ or an anode voltage of the diode $D_2$. This voltage $V_6$ is supplied as the ultimate detected voltage to the multiplier 42 and the power setting switching circuit 62. The output from the lamp ON detection circuit 23 is supplied as an input voltage $V_i$ to the power setting control circuit 60.

The power setting control circuit 60 shown in FIG. 10 is equivalent to the circuit structure shown in FIG. 5. A resistor $R_9$, a capacitor $C_2$, a diode $D_4$, and resistors $R_7$, $R_8$ are equivalent to the resistor $R_0$, the capacitor $C_0$, the diode $D_1$, and the resistors $R_1$, $R_2$ of FIG. 5, respectively. An output voltage $V_5$ from this power setting control circuit 60 ($V_0$ of FIG. 5) is supplied to the power setting circuit 61.

As the operation before and after the time $t_{ON}$ when the lamp lighting switch is turned on, the output voltage $V_2$ and the output current $I_1$ from the down converter 8 of FIG. 7 are substantially the same as those described with reference to FIG. 9. The output $V_i$ from the lamp ON detection circuit 23 is 0 V when the lamp lighting switch is off before the time $t_{ON}$, and the output $V_i$ is +Vcc (for example, +15 V9 when the lamp lighting switch is on after the time $t_{ON}$. The voltage $V_6$ at the connection point between the voltage-division resistors $R_3$, $R_4$ is clamped at a predetermined clamp voltage $V_{11}$ ($V_{11} = +Vcc + V_F$) by the diode $D_2$ for clamping at the time $t_{ON}$ when the lamp lighting switch is turned on, as shown in FIG. 11. After that, the resistance value of the discharge lamp is lowered and the output voltage $V_2$ from the down converter 8 of FIG. 7 is lowered. Therefore, as shown in FIG. 11, a divided voltage $V_{15}$ from the voltage-division resistors $R_{31}$, $R_{32}$ is supplied as the ultimate detected voltage $V_6$ to the multiplier 42 and the power setting switching circuit 62. This divided voltage $V_{15}$ is expressed as follows.

$$V_{15} = V_2 \times (R_{32}/(R_{31}+R_{32}))$$

For example, this is approximately 10 V.

Next, the output voltage $V_5$ from the power setting control circuit 60 ($V_0$ of FIG. 5) is an output obtained by integrating the output $V_i$ from the lamp ON detection circuit 23 at the time-constant circuits of the resistor $R_9$, capacitor $C_2$ and resistors $R_7$, $R_8$, and therefore it has a voltage waveform such that the voltage continuously increases to a voltage $V_{21}$ with a predetermined time constant from the time $t_{ON}$ when the lamp lighting switch is turned on, as shown in FIG. 11. This voltage $V_{21}$ is a voltage $(+Vcc \times R_7/(R_7+R_8)+V_F)$ obtained by adding a divided voltage $(+Vcc \times R_7/(R_7+R_8))$ of the power-supply voltage $+Vcc$ divided at the resistors $R_7$, $R_8$, to a forward voltage drop $V_F$ of the diode $D_4$. This is equivalent to "$V_k+V_F$" obtained by adding the divided voltage $V_k$ ($V_k=V_B \times R_2/(R_1+R_2)$) of the power-supply voltage $V_B$ divided at the resistors $R_1$, $R_2$ to the forward voltage drop $V_F$ of the diode $D_1$, as described above with reference to FIG. 5.

As the output voltage $V_5$ of the power setting control circuit 60 is sent to the power setting circuit 61 and control target power is set, the output power from the down converter 8 of FIG. 7 is controlled so that the output (detected voltage) from the multiplier 42 becomes this target power. That is, the control target power in the power setting circuit 61 is set in accordance with the output voltage $V_5$ from the power setting control circuit 60.

Meanwhile, when lighting of the lamp (discharge lamp) is started, after the lapse of the lamp voltage constant period $T_A$ (for example, approximately 20 to 90 seconds) as described above, the lamp voltage build-up period $T_B$ begins and the output voltage from the down converter 8 of FIG. 7 rises. Therefore, the voltage $V_6$ at the connection point between the voltage-division resistors $R_3$, $R_{32}$ rises as shown in FIG. 11 and is supplied to the power setting switching circuit 62. The power setting switching circuit 62 compares this voltage $V_6$ with a predetermined threshold voltage $V_{16}$ and the result of comparison is reversed at time $t_{13}$. As this result of comparison is sent as a power setting switching output to the power setting circuit 61, the preset target power of the power setting circuit 61 is switched. For example, as the target power of the output power from the down converter 8 of FIG. 7, target power of 30 W at the start-up before the time $t_{13}$ is switched to steady-state target power of 140 W after the time $t_{13}$. However, the present invention is not limited to these numerical values.

According to the specific example described with reference to FIGS. 10 and 11, similar to the embodiment described with reference to FIGS. 1 to 5, the time during which a large current larger than the steady-state current flows through the discharge lamp can be reduced, and heat load on the electrodes and hence thermal fatigue of the electrodes can be reduced. Therefore, exhaustion of the electrodes can be restrained to the minimum level and shortening of the lifetime of the discharge lamp due to the exhaustion of the electrodes can be prevented.

A projector device as an embodiment of the present invention constituted by using the discharge lamp lighting device of the above-described embodiment of the present invention will now be described with reference to FIG. 12.

Figure 12:
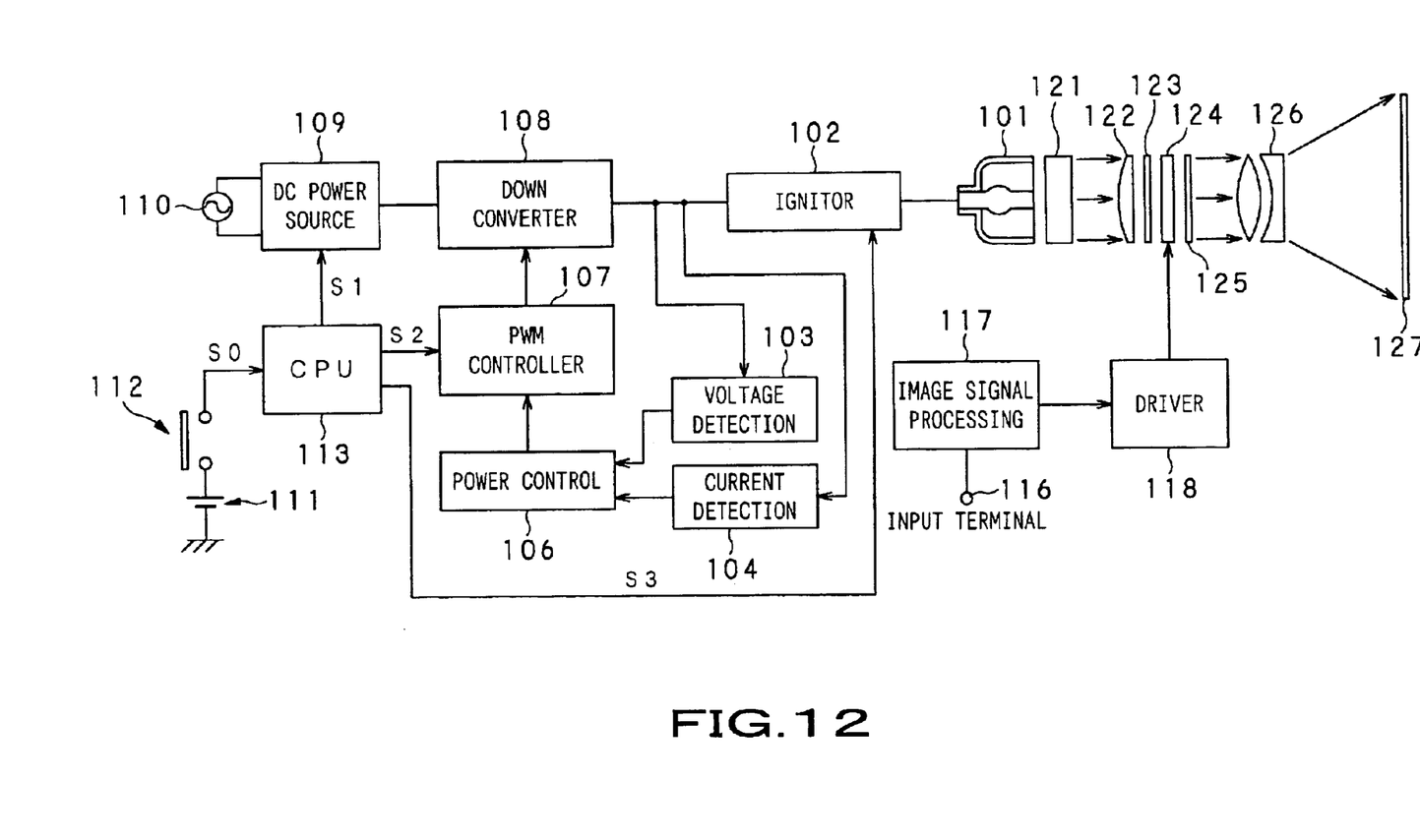
FIG. 12 is a block diagram showing the schematic structure of a projector device using a discharge lamp, as an embodiment of the present invention.

FIG. 12 is a block diagram showing the schematic structure of the projector device using the above-described discharge lamp lighting device. This projector device shown in FIG. 12 has a lamp (discharge lamp) 101 driven for lighting by the above-described discharge lamp lighting device so as to emit light, an integrator 121 for uniformly illuminating an object with the light emitted from the lamp 101, a condensing lens 122 for condensing, in parallel, main light beams emitted from the integrator 121 and directed toward respective spots on the object, a light bulb (123 to 125), which is an object to be illuminated with the light emitted from the condensing lens 122 and modulates and outputs the light incident thereon on the basis of an inputted image signal, and a projection lens 126 for projecting image light outputted from the light bulbs to a screen 127.

The integrator 121 is constituted by, for example, a multi-lens array or the like having element lenses vertically and horizontally arranged in the form of matrix. The element lenses at the corresponding spots illuminate the whole light bulb by using the light having intensity distribution emitted from the lamp 101, thus causing the light incident on the light bulb to be uniform.

In this embodiment, the light bulb is constituted by a incident-side polarizing plate 123, a liquid crystal panel 124, and an emitting-side polarizing plate 125. With respect to light in a predetermined direction of polarization passed through the incident-side polarizing plate 123, the liquid crystal panel 124 rotates the direction of polarization by a voltage applied thereto on the basis of an image signal. A polarized light component in a predetermined direction, of the light with the rotated direction of polarization, passes through the emitting-side polarizing plate 125. Thus, an output (emitting light) modulated from the incident light on the basis of the image signal is generated.

To equalize the direction of polarization of the light incident on the incident-side polarizing plate 123, a PS converter for converting light emitted from the lamp to light in a substantially predetermined direction of polarization may be provided near the integrator 121. Although one light bulb is used in this embodiment as shown in FIG. 12, the projector device may also be constituted by using three light bulbs corresponding to primary colors, together with color separation means made up of a dichroic mirror or the like and color synthesis means made up of a dichroic prism or the like.

After an image signal inputted to an input terminal 116, for example, a video signal, is decoded to a primary color signal of RGB, the modulation at the liquid crystal panel 124 is carried out by using a known structure including image signal processing means 117 for carrying out processing such as number-of-pixel conversion in accordance with the element array of the liquid crystal panel 124 and a driver 118 for driving to apply a voltage to each pixel of the liquid crystal panel 124 by an output from the image signal processing means 117.

In the above-described structure, light emitted by lighting the lamp 101 is made uniform by the integrator 121 and the directions of main light beams of the light (luminous flux) directed toward the respective spots on the liquid crystal panel 124 are made substantially parallel by the condensing lens 122. The parallel light beams pass through the incident-side polarizing plate 123 and become incident on the liquid crystal panel 124. By the projection lens 126, which projects the image on the liquid crystal panel 124 onto the screen 127, the light passed through the emitting-side polarizing plate 125 is projected onto the screen 127. Thus, the projector device displays the image based on the input image signal onto the screen 127.

Next, a starting system of the projector device in which the lamp 101 is lit to emit light will be described. This starting system substantially corresponds to the discharge lamp lighting device described above with reference to FIGS. 1 and 7. Hereinafter, it will be described on the basis of the structure shown in FIG. 12.

In FIG. 12, the starting system has the above-described discharge lamp lighting device which operates by using a DC power source 109 for supplying power converted to a DC voltage from an external AC power source 110. The lamp 101, an ignitor 102, a voltage detection circuit 103, a current detection circuit 104, a down converter 108, and the DC power source 109 are equivalent to the discharge lamp 1, the ignitor 2, the voltage detection circuit 3, the current detection circuit 104, the down converter 8, and the DC power source 9 of FIGS. 1 and 7, respectively. A power control circuit 106 and a PWM controller 107 of FIG. 12 correspond to the control circuit 6 and the PWM controller 7 of FIG. 1, or the multiplier 42, the power setting circuit 61 and the control circuit 70 and the like of FIG. 7. Moreover, the starting system of FIG. 12 has a CPU 113 as a system microcomputer for controlling the whole system of the projector device, a power switch 112 for giving an ON command (or OFF command) to the CPU 113 on the basis of a user's operation, and a standby power source 111.

In this starting system, the CPU 113 is adapted for controlling the whole system and particularly functions as starting control means for controlling the operations of the DC power source 109, the PWM controller 107 and the ignitor 102. Specifically, in accordance with a system control program read from a ROM, not shown, the CPU 113 receives an ON command from the power switch 112 and outputs a predetermined control command to a control object. The CPU 113 also has a timer function to control the timing for a control command.

The DC power source 109 is controlled to start (or stop) power supply to the down converter 108, by a command S1 from the CPU 113. Specifically, a semiconductor switch provided on the output side from the active filter to the down converter 108 is ON/OFF-controlled by the command S1.

The PWM controller 107 of the discharge lamp lighting device is controlled to start (or stop) supplying a pulse to the down converter 108, by a command S2 from the CPU 113. Specifically, a rectangular wave with a predetermined duty factor is provided by a comparator which compares a triangular wave generated by an internal oscillator with a predetermined DC level and generates a fan-out, the oscillation output of the triangular wave is ON/OFF-controlled by the command S2. A lighting command S3 to the ignitor 102 is to instruct start of the above-described discharge lamp lighting operation.

In the above-described structure, in a so-called standby state where the projector device is inoperative and the minimum necessary function for starting operation is active by using the standby power source, as the user turns on the power switch 112, an ON command S0 is given to the CPU 113. On the basis of this ON command S0, the CPU 113 first outputs the command S1 to turn on the DC power source 109 and the DC power source 109 starts supplying power to the down converter 108. Meanwhile, the CPU 113 times the time from the reception of the ON command S0 by using the timer, and after a predetermined time, for example, 2 to 3 seconds, the CPU 113 outputs the command S2 to turn on the output of the PWM controller 107, so that a rectangular wave for the down converter 108 to start its function is supplied. After the preparation for power supply to the lamp 101 is thus completed, the CPU 113 outputs the lighting command S3 to the ignitor 102 to start lighting the lamp 101. Thus, the lighting operation as described in the above-described embodiment is started in the projector device.

In this manner, power supply from the DC power source 109 is started, and when its output is stabilized after a predetermined time, for example, 2 to 3 seconds, a rectangular wave for causing the down converter 108 to function is supplied from the PWM controller 107. Therefore, the down converter 108 can be securely activated. Moreover, after the down converter 108 starts operation and power is supplied to the lamp 101, the ignitor 102 carries out the operation to light the lamp 101. Therefore, the lighting device can operate while securely preventing the influence of a transitional instability at the start of power supply.

After the lighting operation of the discharge lamp lighting device is started, the current supplied to the lamp 101 after ignition is controlled to gradually increase, as described in the embodiments of FIGS. 1 and 7. Thus, the time during which a large current larger than the steady-state current flows through the discharge lamp can be significantly reduced, and heat load on the electrodes and hence thermal fatigue of the electrodes can be reduced. Therefore, exhaustion of the electrodes can be restrained to the minimum level. Thus, in this projector device, shortening of the lifetime of the lamp 101 due to the exhaustion of the electrodes can be prevented. The current control means of the discharge lamp lighting device can be realized with a simple structure, and the discharge lamp lighting device with high reliability can be produced inexpensively.

It is to be noted that the present invention is not limited to the foregoing description and various changes and modification can be made without departing from the scope of the present invention.

What is claimed is:

1. A discharge lamp lighting device for lighting a discharge lamp comprising:
    starting means for applying a starting voltage to said discharge lamp at a time of starting so as to ignite said discharge lamp;
    voltage detection means for detecting a voltage applied to said discharge lamp; and
    current control means for controlling a current supplied to said discharge lamp based on the voltage detected by said voltage detection means,
    wherein after ignition said current control means starts controlling the current supplied to said discharge lamp based on the voltage detected by said voltage detection means and continuously increases the current supplied to said discharge lamp at a predetermined rate to a predetermined current larger than a steady-state current of said discharge lamp.

2. The discharge lamp lighting device as claimed in claim 1, wherein said current control means comprises voltage correction setting means for correcting the voltage detected by said voltage detection means, and controls the current supplied to said discharge lamp based on the voltage corrected by the voltage correction setting means, and
    the voltage correction setting means performs correction to continuously decrease the voltage after said ignition at a predetermined rate to a predetermined voltage value, thus continuously changing the current supplied to said discharge lamp at a predetermined rate of increase.

3. The discharge lamp lighting device as claimed in claim 1, wherein said current control means comprises power setting control means for controlling a target power value that controls the current supplied to said discharge lamp, and
    the power setting control means performs control to continuously increase the target power value after said ignition at a predetermined rate, thus continuously changing the current supplied to said discharge lamp at a predetermined rate of increase.

4. A projector device comprising:
    a discharge lamp;
    a discharge lamp lighting device for lighting said discharge lamp; and
    an optical system for projecting light emitted from said discharge lamp;

said discharge lamp lighting device including:
- starting means for applying a starting voltage to said discharge lamp at time of starting and igniting said discharge lamp;
- voltage detection means for detecting a voltage applied to said discharge lamp; and
- current control means for controlling a current supplied to said discharge lamp based on the voltage detected by said voltage detection means, wherein after ignition said current control means starts controlling the current supplied to said discharge lamp based on the voltage detected by said voltage detection means and continuously increases the current supplied to said discharge lamp at a predetermined rate to a predetermined current larger than a steady-state current of said discharge lamp.

5. The projector device as claimed in claim 4, wherein said optical system comprises means for modulating light emitted from said discharge lamp based on an inputted image signal.

6. The projector device as claimed in claim 4, wherein said current control means comprises voltage correction setting means for correcting the voltage detected by said voltage detection means, and controls the current supplied to said discharge lamp based on the voltage corrected by the voltage correction setting means, and the voltage correction setting means performs correction to continuously decrease the voltage after said ignition at a predetermined rate to a predetermined voltage, thus continuously changing the current supplied to said discharge lamp at a predetermined rate of increase.

7. The projector device as claimed in claim 4, wherein said current control means comprises power setting control means for controlling a target power value that controls the current supplied to said discharge lamp, and the power setting control means performs control to continuously increase the target power value after said ignition at a predetermined rate, thus continuously changing the current supplied to said discharge lamp at a predetermined rate of increase.

* * * * *